(12) United States Patent
Hood et al.

(10) Patent No.: US 7,651,748 B2
(45) Date of Patent: Jan. 26, 2010

(54) COATING COMPOSITIONS FOR FORMING INKJET-RECEPTIVE COATINGS ON A SUBSTRATE

(75) Inventors: David K. Hood, Basking Ridge, NJ (US); John G. Mc Kittrick, Jersey City, NJ (US); Surya Kamin, Skillman, NJ (US)

(73) Assignee: ISP Investments Inc., Wilmington, DE (US)

( * ) Notice: Subject to any disclaimer, the term of this patent is extended or adjusted under 35 U.S.C. 154(b) by 156 days.

(21) Appl. No.: 11/546,069

(22) Filed: Oct. 11, 2006

(65) Prior Publication Data

US 2007/0092666 A1 Apr. 26, 2007

Related U.S. Application Data

(60) Provisional application No. 60/730,132, filed on Oct. 25, 2005, provisional application No. 60/735,545, filed on Nov. 10, 2005.

(51) Int. Cl.
*B41M 5/50* (2006.01)

(52) U.S. Cl. ............... 428/32.34; 428/32.23; 428/32.26; 428/32.29; 428/32.38; 524/493

(58) Field of Classification Search ................... 523/160
See application file for complete search history.

(56) References Cited

U.S. PATENT DOCUMENTS

| | | | |
|---|---|---|---|
| 6,254,958 B1 * | 7/2001 | Yoshida et al. ............. | 428/64.2 |
| 6,369,180 B1 * | 4/2002 | Shih et al. .................. | 526/264 |
| 6,465,078 B1 * | 10/2002 | Kawai et al. ............. | 428/32.26 |
| 6,620,521 B1 | 9/2003 | Kwak et al. | |
| 6,689,432 B2 * | 2/2004 | Kitamura et al. ......... | 428/32.37 |
| 6,866,383 B2 | 3/2005 | Naik et al. | |
| 6,936,316 B2 * | 8/2005 | Nigam et al. ............. | 428/32.17 |
| 2003/0059584 A1 * | 3/2003 | Onishi et al. ................ | 428/195 |
| 2003/0219539 A1 * | 11/2003 | Nigam ..................... | 427/372.2 |
| 2004/0009312 A1 | 1/2004 | Koenig | |
| 2004/0048007 A1 * | 3/2004 | Katoh et al. ............... | 428/32.1 |
| 2004/0121094 A1 * | 6/2004 | Aert et al. .................. | 428/32.1 |
| 2004/0152819 A1 * | 8/2004 | Cuch .......................... | 524/430 |
| 2004/0166252 A1 * | 8/2004 | Takashima et al. ........ | 428/32.1 |
| 2005/0027068 A1 * | 2/2005 | Kopolow et al. ........... | 524/808 |
| 2005/0146589 A1 * | 7/2005 | Gibbison et al. ........... | 347/105 |
| 2005/0222353 A1 | 10/2005 | Kopolow et al. | |

OTHER PUBLICATIONS

PCT, International Search Report, International Application No. PCT/US2006/039845 (2 pages) (mailed Jan. 17, 2008; published May 7, 2009).
PCT, International Preliminary Report on Patentability, International Application No. PCT/US2006/039845 (5 pages) (Mar. 17, 2009).

* cited by examiner

*Primary Examiner*—James Seidleck
*Assistant Examiner*—Vu Nguyen
(74) *Attorney, Agent, or Firm*—William J. Davis; Thompson Hine LLP

(57) ABSTRACT

An inkjet coating composition for coating a substrate to absorb ink from an inkjet printer comprises a combination of (a) polydiallyldimethyl ammonium chloride (pDADMAC), (b) a crosslinkable cationic polymer, (c) colloidal silica, (d) silica gel, (e) a binder, preferably vinyl acetate-ethylene copolymer, and (f) water.

18 Claims, No Drawings

COATING COMPOSITIONS FOR FORMING INKJET-RECEPTIVE COATINGS ON A SUBSTRATE

CROSS-REFERENCE TO RELATED U.S. PATENT APPLICATIONS

This application corresponds to U.S. Provisional Patent Application Ser. No. 60/730,132, filed Oct. 25, 2005 and Ser. No. 60/735,545, filed Nov. 10, 2005, the complete disclosures of each of these applications is hereby incorporated by reference herein.

BACKGROUND OF THE INVENTION

1. Field of the Invention

This invention relates to inkjet printing onto a coated substrate, and, more particularly, to coating compositions which enable the ink to be absorbed onto the substrate effectively.

2. Description of the Prior Art

Inkjet printing is a highly successful method of forming images on different substrates such as paper, polyester, vinyl and canvas. However, it is desired to provide new and improved inkjet coating compositions which exhibit advantageous properties in commercial use. One such sought-after property, is an ability to absorb and retain the ink effectively.

SUMMARY OF THE INVENTION

What is described herein is an inkjet coating composition of the invention which includes:
(a) poly(diallyldimethyl ammonium chloride) (pDADMAC),
(b) a crosslinkable cationic copolymer, (c) colloidal silica,
(d) silica gel, (e) a binder, preferably vinyl acetate-ethylene copolymer, and (f) water.

A suitable coating composition for forming an inkjet-receptive coating on a substrate comprises:
(a) p(diallyidimethyl ammonium chloride),
(b) a crosslinkable cationic polymer,
(c) colloidal silica,
(d) silica gel,
(e) a binder, and
(f) water.

Preferably, the coating composition comprises, by weight,
(a) is 0.1-30%,
(b) is 1-50%,
(c) is 0.1-50%,
(d) is 0.1-55%,
(e) is 0.1-45%, and
(f) to 100%.

Most preferably, the coating composition comprises, by weight,
(a) is 1-25%,
(b) is 5-45%,
(c) is 1-20%,
(d) is 5-50%,
(e) is 5-35%, and
(f) to 100%.

Optimally, the coating composition comprises, by weight,
(a) is 2-20%,
(b) is 10-35%,
(c) is 2-10%,
(d) is 10-45%,
(e) is 6-25%, and
(f) to 100%.

Preferably (b) is a terpolymer of quaternized vinyl caprolactam (VCL), dimethylaminopropyl methacrylamide (DMAPMA) and hydroxyl ethyl methacrylate (HEMA), e.g. by weight, the terpolymer comprises 60-90% VCL, 10-30% DMAPMA and 2-10% HEMA.

Alternatively, (b) is a copolymer of vinyl pyrrolidone (VP) and dimethylaminopropyl methacrylamide (DMAPMA).

Suitably, the coating composition of the invention may include one or more of the following optional ingredients: crosslinked PVP; PVP, polyvinyl alcohol, a copolymer of vinyl pyrrolidone and dimethylaminopropyl methacrylamide neutralized with HCl or sulfuric acid, a crosslinker, calcium carbonate, titanium dioxide, barium sulfate, barium chloride, aluminum sulfate, aluminum chloride, polyethyloxazoline, Disintex® 1000, and/or a surfactant.

Suitably the coating composition of the invention forms a matte-finished inkjet coating on polyester, vinyl, paper and canvas.

Generally, the coating composition has a solids content of about 15-30%, and a viscosity of about 200-400 cps.

Preferably, (e) is a vinyl acetate-ethylene copolymer; (c) has a particle size of about 20-150 nm, and (d) has a particle size of about 1.5 to 10μ, most preferably, (c) has a particle size of about 25-50 nm, and (d) has a particle size of about 4.5 to 8μ.

Suitably, in the coating composition (e) is a latex.

What is formed herein is an inkjet-receptive coated substrate coated with the dried composition of the invention, which forms color inkjet images which dry rapidly, has good color density, exhibits low color density loss, and is water-resistant and adhesive.

Another embodiment of the invention is an aqueous dispersion of the inkjet composition.

DETAILED DESCRIPTION OF THE INVENTION

In the composition of the present invention, the crosslinkable cationic polymer (b) suitably can comprise tertiary amino groups and/or hydroxyl groups. Preferably, (a) is a crosslinkable polymer of a vinyl lactam/dimethylaminopropyl methacrylamide/hydroxyethyl methacrylate terpolymer or a vinyl lactam/dimethylaminopropyl methacrylamide copolymer. A preferred vinyl lactam is vinyl caprolactam. A particularly preferred example of such a cationic polymer is the resin ViviPrint™ 200 manufactured by International Specialty Products (ISP). Such terpolymer preferably comprises vinyl caprolactam (VCL), dimethylaminopropyl methacrylamide (DMAPMA) and hydroxyethyl methacrylate (HEMA), uncrosslinked or crosslinked, unquaternized or quaternized, preferably quaternized and crosslinked. Suitable quaternizing agents include HCl and $H_2SO_4$. Preferably, the terpolymer comprises, by wt., 60-90% VCL, 10-30% DMAPMA and 2-10% HEMA, preferably 75-80% VCL, 13-16% DMAPMA and 4-6% HEMA.

Another preferred example of a cationic copolymer is the resin ViviPrint™ 131, 121 or 300, manufactured by ISP. For example, ViviPrint 131 is VP/DMAPMA copolymer neutralized with HCl.

The terpolymer suitably has a molecular weight of about 500,000 to about 1,500,000, preferably about 500,000 to about 1,000,000.

The cationic polymer suitably can be present in an amount by weight, of about 1 to about 50%, and, preferably, for ViviPrint™ 200, about 5 to about 45%, and, more preferably, of about 10 to about 40%, of the composition.

The colloidal silica (c) suitably are amorphous colloidal silica particles e.g. 20-150 nm. Preferred colloidal silicas are Silcron IJ-25 and IJ-50.

The silica gel (d) suitably are amorphous colloidal silica particles, e.g. 1.5-10μ. A preferred silica gel is Silcron G100.

In a preferred embodiment of the invention, the binder (e) is a vinyl acetate-ethylene copolymer e.g. Airflex® 465 Emulsion, available from Air Products. Airflex® 465 emulsion is a rapid-setting vinyl acetate-ethylene copolymer, which is a high-solids emulsion. This polymer adheres well to various substrates such as polyester, poly(ethylene terephthalate), tempered aluminum foil and polystyrene. This emulsion combines a high-solids content with a low viscosity, which is a combination that permits the addition of high-filler loadings, resulting in adhesive formulations with solid contents of 80%, or more. Furthermore, this emulsion does not thicken excessively on the addition of plasticizers which allows for the formulation of very high-solids adhesives. Airflex® 465 emulsion also is shear stable, and can be applied on high-speed packaging machines using roll, extrusion or spray equipment. The emulsion dries to a slightly tacky, clear, water-resistant film.

| Typical Emulsion Properties of Airflex ® 465 | |
| --- | --- |
| % Solids | 67 ± 1% |
| Viscosity, cPs | 800-1,300 |
| pH | 4.5-5.5 |
| Copolymer Type | Vinyl Acetate-Ethylene |
| Protective Colloid | PVOH |
| Mechanical Stability | Excellent |
| Wet Tack | High |
| Density, lb/gal | 8.9 |

Optional components in the composition for optimization of the coating composition when coated on different substrates include pigments, clays, e.g. organoclays and water-swellable clays, acrylic polymers, acrylic copolymers, alginates, carrageenan, microcrystalline cellulose, gelatin, carboxymethylcellulose sodium, hydroxyethylcellulose, hydroxypropylcellulose, hydroxypropylmethylcellulose, methylcellulose, guar and guar derivatives, locust bean gum, polyethylene oxide, polyvinylpyrrolidones, copolymers of polyvinylpyrrolidones, polyvinylalcohols, other water soluble polymers, silica, aluminates, zirconates, calcium carbonates, xanthan gum and the like, polymers or copolymers of a water soluble vinyl lactam optionally having in situ-formed particles of crosslinked vinyl lactam polymer or copolymer, crosslinked polyvinyl pyrrolidone, and crosslinkers to achieve advantageous inkjet printable surface coatings having light stability. Preferred components and optimal amounts of these components will depend upon the specific support coating and application and can be readily determined by one of ordinary skill in the art.

The inkjet coating compositions of the invention can provide a matte finish coating on polyester, vinyl, paper or canvas.

COMPOSITIONS OF INVENTION

Example 1

TABLE 1

| Component | Mass | % Solids | Solids Mass | % Dry Composition |
| --- | --- | --- | --- | --- |
| (a) p(DADMAC) | 55 | 35 | 19.25 | 10.22 |
| (b) Silcron ® IJ-25 | 20 | 30 | 6 | 3.19 |
| (c) Airflex ® 465 | 60 | 67 | 40.2 | 21.35 |
| (d) Silcron ® G 100 | 80 | 100 | 80 | 42.49 |
| (e) ViviPrint ™ PS-10 | 2 | 100 | 2 | 1.06 |
| (f) ViviPrint ™ 131 | 350 | 11 | 38.5 | 20.45 |
| (g) Heloxy ® 67 | 2 | 100 | 2 | 1.06 |
| (h) Ancarez ® AR 550 | 0.6 | 55 | 0.33 | 0.18 |
| Water | 750 | | | |

This formulation is a multifunctional composition for various substrates including, but not limited to, paper, vinyl, plastics and canvas.

(a) Aldrich Chemicals—polymer for matte finish
(b) Millenium Corporation—colloidal silica—25 nm
(c) Air Products—latex binder
(d) Millenium Corporation—silica gel—5.5 microns
(e) ISP—crosslinked polyvinylpyrrolidone (PVP)
(f) ISP—VP/DMAPMA, HCl neutralized polymer
(g) Resolution Performance Products—diglycidyl ether of butane diol
(h) Air Products—polyepoxy resin—crosslinker

Example 2

TABLE 2

| Ingredient | Mass | % Solids | Dry Mass | % Composition |
| --- | --- | --- | --- | --- |
| (a) p(DADMAC) | 20 | 35 | 7 | 6.7 |
| (b) Silcron ® IJ-25 | 20 | 30 | 20.9 | 20.1 |
| (c) UCAR ® 313 (Dow) | 15 | 48 | 7.2 | 6.9 |
| (d) Silcron ® G 100 | 20.9 | 100 | 6 | 5.8 |
| (e) ViviPrint ™ 200 | 53 | 30 | 15.9 | 15.3 |
| (h) Ancarez ® AR 550 | 9 | 55 | 4.9 | 4.8 |
| (i) Barium Sulfate | 20.9 | 100 | 20.9 | 20.1 |
| (j) Digitex ® 1000 | 20.9 | 100 | 20.9 | 20.1 |
| Water | 294 | | | |

(c) Dow—Modified styrene-butadiene latex
(e) ISP—VCL/DMAPMA/HEMA terpolymer (i) Aldrich—pigment, dye binding
(j) Englehard—Kaolin The composition in Table 2 is film-forming, dye bonding and crosslinkable, and is particularly suitable for coating on canvas substrates.

Example 3

TABLE 3

| Ingredient | Wt (g) | |
|---|---|---|
| | (1) | (2) |
| Mix A | | |
| Silcron IJ-25 | 2 | 2 |
| Silcron G-100 | 8 | 8 |
| ViviPrint PS-10 | 0.2 | 0.2 |
| Water | 75 | 75 |
| Mix B | | |
| p(DADMAC)-35% solid | 5.5 | 5.5 |
| Airflex 465 | 6 | 6 |
| ViviPrint131 (as is) | 35 | 35 |
| Water | 15 | 15 |

Coating Process

To 10 g of Mix A and B in (1) was added 0.1 g of Heloxy® 67 and 0.075 Ancarez® AR 550. The viscosity was 710 cps (#3, 50 rpm LV). The coating weight was 12-13 g. A #60 rod was used for vinyl and polyester terephthalate substrates; and a #40 rod for paper.

To 10 g of Mix A and B in (2) was added 0.1 g of XAMA-7 (polyaziridine crosslinker) and coated on both paper and vinyl.

Suitable (e) binders include a latex, polyvinyl alcohol, gelatin and starch. Preferred is a latex.

Suitable pigments include titanium dioxide, clay, alumina and calcium carbonate.

Example 4

TABLE 4

| Water | 675 |
|---|---|
| Silcron IJ 50 (50 nm) | 30 |
| Silcron G 100 | 144 |
| ViviPrint PS 10 | 6 |
| NeoCar® 820 | 48 |
| Aquazol® 200 (20% solids) | 50 |
| ViviPrint ™ 300 | 50.9 |
| ViviPrint ™ 200 | 160.5 |
| pDADMAC (35% Ciba) | 45 |
| Surfynol® 440 | 3 |
| Kodak CP349w | 21 |
| Heloxy ® 68 | 43 |

TABLE 4-continued

| Ancarez ® AR 550 | 31 |
|---|---|
| Isopropyl alcohol | 25 |

| Brookfield Viscosity | Brookfield Viscosity |
|---|---|
| Soln A (40 + 60 rod) | Soln B (70 rod) |
| LV | LV |
| 50 RPMs | 50 RPMs |
| SPDL #3 | SPDL #3 |
| 1010 cps | 1010 cps |

Coated on Vinyl using a # 40, 60 and 70 rods
Heaters

A = 125

Example 5

TABLE 5

| Water | 720 |
|---|---|
| SiLCRON G-100 | 120 |
| ViviPrint PS-10 | 3 |
| SiLCRON IJ-25 | 30 |
| Airflex 465 | 90 |
| ViviPrint 200 | 100 |
| ViviPrint 131 | 280 |
| Agefloc WT 35 VLV-P | 82.5 |
| Heloxy 68 | 3 |
| Ancarez AR 550 | 0.9 |
| Total | 1429.4 |

Brookfield Viscosity, Spindle #3, 30 RPMS is 527 cps

Example 6

Water, Silcron G-100, PS-10, barium sulfate, and titanium dioxide were well blended and homogenized. To this mixture was added Airflex® 465, Aquazol® 200 (20% solids), and ViviPrint™ 200 (30% solids). Using a LV Brookfield Viscometer, the viscosity was measured as ~290 cPs ((6)4, 70 RPM). The compositions contained 22.5% solids in water.

Example 7

Step 1: Add 600 g of water to a 1.5 L beaker.
Step 2: Add 65 g of Silcron G-100 (ISP/Millenium), 13 g of BaSO$_4$, 13 g of ViviPrint PS10 (ISP) and 2 g of TiPure TiO$_2$ (duPont). Homogenize.
Step 3: Add 130 g of Airflex 465 (Air Products). Mix thoroughly, homogenize if necessary.
Step 4: Add 390 g of Aquazol 200 (ISP/PCI, 20% solids in water, previously made). Mix thoroughly, homogenize if necessary.
Step 5: Add 197 g of ViviPrint 200 (ISP, "as is"). Mix thoroughly, homogenize if necessary.

Example 8

TABLE 6

| Component | Mass | % Solids | Dry Composition |
|---|---|---|---|
| ViviPrint 200 VCL/DMAPMA/HEMA HCl terpolymer (ISP) | 197.99 | 30.00 | 18.57 |
| Silcron G-100 - Silica gel | 65.00 | 100.00 | 20.43 |
| Airflex 465 - vinyl acetate-ethylene copolymer | 130.00 | 67.00 | 27.37 |
| Water | 600.00 | | |
| ViviPrint PS 10 - crosslinked polyvinyl pyrrolidone 15μ (ISP) | 13.00 | 100.00 | 4.09 |
| BaSO$_4$ - 5-10μ | 13.00 | 100.00 | 4.09 |
| TiPure - titanium dioxide | 2.00 | 100.00 | 0.63 |
| Aquazol 200 | 395.00 | 20.00 | 24.83 |
| Percent Solids | | 22.49% | |

This coating composition was applied using a Rotary Coater Instrument equipped with either a #40 or #60 wire round rod. The resulting coating weights were ~10 gsm or 24 gsm, respectively. To dry the coating, 3 IR driers and 3 zone heating were employed. The ovens were set for 145° C., 135° C., and 125° C. for the 10 gsm coating and 145° C., 135° C., 125° C for the 24 gsm coating.

Example 9

TABLE 7

| Component | Mass | % Solids | Solids Mass | % Dry Composition |
|---|---|---|---|---|
| ViviPrint ™ 131 | 350 | 11 | 38.5 | 20.45 |
| Silcron ® IJ-25 | 20 | 30 | 6 | 3.19 |
| Airflex ® 465 | 60 | 67 | 40.2 | 21.35 |
| Water | 750 | | | |
| ViviPrint ™ PS-10 | 2 | 100 | 2 | 1.06 |
| p(DADMAC) | 55 | 35 | 19.25 | 10.22 |
| Heloxy ® 67 | 2 | 100 | 2 | 1.06 |
| Ancarez ® AR 550 | 0.6 | 55 | 0.33 | 0.18 |
| Silcron ® G 100 | 80 | 100 | 80 | 42.49 |

Example 10 below illustrates a matte, inkjet printable coating applied to white Melanex film. The coating is fast drying and exhibits water resistance.

Example 10

Step 1: Add 18.4 g of water to a 50 mL beaker.
Step 2: Add 3.1 g of Silcron G-100 (ISP/Millennium). Homogenize. This is vessel 1.
Step 3: Add 1 g of pDADMAC, 0.75 g UCAR 313 (Dow), 2.65 g of ViviPrint 200 (ISP). Mix thoroughly. This is vessel 2.
Step 4: Slowly add vessel 2 to vessel 1.
Step 5: Add 0.45 g of Ancarez AR 550 (Air Products) and mix thoroughly. Add 0.05 g Surfynol 440. Mix thoroughly, homogenize if necessary.

TABLE 8

| Component | Mass | % Solids | Solid | % Wt. |
|---|---|---|---|---|
| Water | 18.4 | | | |
| Silcron G-100 | 3.1 | 100.00 | 3.1 | 61.3 |
| Silcron IJ-25 | 1 | 30.00 | 0.3 | 5.9 |
| pDADMAC | 1 | 20.00 | 0.2 | 4.0 |
| UCAR 313 | 0.75 | 48.00 | 0.36 | 7.1 |
| ViviPrint 200 | 2.65 | 30.00 | 0.795 | 52.4 |
| Ancarez AR550 | 0.45 | 55.00 | 0.2475 | 4.9 |
| Surfynol 440 | 0.05 | 100 | 0.05 | 1 |
| Total | 27.4 | | 5.0525 | |
| Percent Solids | | 18.4% | | |

Example 11

TABLE 9

| Component | Mass | % Dry Composition | |
|---|---|---|---|
| Water | 107.00 | | |
| IPA | 5.00 | | |
| Silcron G-100 | 18.00 | 50.66 | |
| ViviPrint PS-10 | 0.30 | 0.84 | |
| Silcron IJ-25 | 3.00 | 2.53 | |
| Airflex 465 | 10.00 | 18.86 | |
| ViviPrint 131 | 52.00 | 16.10 | |
| ViviPrint 300 | 3.00 | 2.53 | |
| Zetag 35VLV | 8.70 | 7.35 | |
| Heloxy 67 | 0.30 | 0.84 | |
| Ancarez AR550 | 0.09 | 0.14 | |
| Easy Wet 20 | 0.05 | 0.14 | % Solids |
| Total | 207.44 | 100.00 | 17.13 |

Example 12

TABLE 10

| Product | Supplier | Mass | % Solids | Solid Mass (g) | % in Dry Composition |
|---|---|---|---|---|---|
| Water | | 1125 | | | |
| Silcron G-100 | ISP | 120 | 100 | 120 | 39.3 |
| ViviPrint PS-10 | ISP | 3 | 100 | 3 | 1 |
| Silcron IJ-25 | ISP | 30 | 30 | 9 | 2.9 |
| Airflex 465 | Air Products | 90 | 67 | 60.3 | 19.7 |
| ViviPrint 121 | ISP | 525 | 11 | 57.8 | 18.9 |
| Zetag 7115 | Ciba | 135 | 20 | 27 | 8.8 |
| Berset 2003 | Bercen | 36 | 79 | 28.4 | 9.3 |
| Easy Wet 20 | ISP | 5 | 1 (previously diluted) | 0.05 | 0.02 |
| Phosphoric Acid | | | | | |
| Total | | 2069 | | 305.6 | |

Percent Solids of Coating is ~15, Viscosity ~530 cPs (LV, # 3, 50 RPM)

The printable coating compositions of the invention can be applied to paper, polyester, vinyl, canvas, etc. using a suitable wire wound rod to achieve an approximate coat weight of 15 gsm. The coating typically is dried in an oven where the set point is 100° C.-150° C.

What is claimed is:
1. A coating composition for forming an inkjet-receptive coating on a substrate comprising:
    (a) p(diallyldimethyl ammonium chloride),
    (b) a crosslinkable cationic polymer,
    (c) colloidal silica,

(d) silica gel,
(e) a latex binder, and
(f) water.

2. A coating composition according to claim 1, comprising, by weight,
(a) is 0.1-30%,
(b) is 1-50%,
(c) is 0.1-50%,
(d) is 0.1-55%,
(e) is 0.1-45%, and
(f) to 100%.

3. A coating composition according to claim 1, comprising, by weight,
(a) is 1-25%,
(b) is 5-45%,
(c) is 1-20%,
(d) is 5-50%,
(e) is 5-35%, and
(f) to 100%.

4. A coating composition according to claim 1, comprising, by weight,
(a) is 2-20%,
(b) is 10-35%,
(c) is 2-10%,
(d) is 10-45%,
(e) is 6-25%, and
(f) to 100%.

5. A coating composition according to claim 1 wherein (e) is a vinyl acetate-ethylene copolymer.

6. A coating composition according to claim 1 wherein (e) is a styrene-butadiene copolymer.

7. A coating composition according to claim 1 wherein (e) is an acrylic latex.

8. A coating composition according to claim 1 wherein (c) has a particle size of about 20-150 nm.

9. A coating composition according to claim 1 wherein (d) has a particle size of about 1.5 to 10μ.

10. A coating composition according to claim 1 wherein (b) is a terpolymer of quaternized vinyl caprolactam (VCL), dimethylaminopropyl methacrylamide (DMAPMA) and hydroxyl ethyl methacrylate (HEMA).

11. A coating composition according to claim 10 wherein, by weight, the terpolymer comprises 60-90% VCL, 10-30% DMAPMA and 2-10% HEMA.

12. A coating composition according to claim 1 wherein (b) is a copolymer of vinyl pyrrolidone (VP) and dimethylaminopropyl methacrylamide (DMAPMA).

13. A coating composition according to claim 1 which can include one or more of the following optional ingredients: crosslinked PVP; PVP, polyvinyl alcohols, a copolymer of vinyl pyrrolidone and dimethylaminopropyl methacrylamide neutralized with HCl, a crosslinker, titanium dioxide, barium sulfate, barium chloride, calcium carbonate, aluminum sulfate, aluminum chloride, polyethyloxazoline, Disintex® 1000, or a surfactant.

14. A coating composition according to claim 1 which forms a matte-finished inkjet coating on polyester, vinyl, paper or canvas.

15. A coating composition according to claim 1 having a solids content of about 15-30%.

16. A coating composition according to claim 1 having a viscosity of about 200-900 cps.

17. An inkjet-receptive coated substrate coated with the dried composition of claim 1 which forms color inkjet images which dry rapidly, has good color density, exhibits low color density loss, and is water-resistant.

18. An aqueous dispersion of the composition of claim 1.

* * * * *